United States Patent
Badino et al.

(10) Patent No.: US 11,441,623 B2
(45) Date of Patent: Sep. 13, 2022

(54) METHOD AND SYSTEM FOR REDUCING OR ELIMINATING NOISE GENERATED BY THE DISC BRAKES OF A MOTOR-VEHICLE

(71) Applicant: FCA Italy S.p.A., Turin (IT)

(72) Inventors: Renato Badino, Turin (IT); Stefano Lucà, Turin (IT)

(73) Assignee: FCA Italy S.p.A., Turin (IT)

(*) Notice: Subject to any disclaimer, the term of this patent is extended or adjusted under 35 U.S.C. 154(b) by 511 days.

(21) Appl. No.: 16/600,710

(22) Filed: Oct. 14, 2019

(65) Prior Publication Data

US 2020/0116220 A1    Apr. 16, 2020

(30) Foreign Application Priority Data

Oct. 16, 2018 (EP) .................................. 18200795

(51) Int. Cl.
| | |
|---|---|
| *F16D 65/38* | (2006.01) |
| *F16D 65/00* | (2006.01) |
| *B60T 1/06* | (2006.01) |
| *B60T 8/17* | (2006.01) |
| *B60T 17/00* | (2006.01) |

(52) U.S. Cl.
CPC .......... *F16D 65/0006* (2013.01); *B60T 1/065* (2013.01); *B60T 8/17* (2013.01); *B60T 17/00* (2013.01)

(58) Field of Classification Search
CPC ........ F16D 65/0006; B60T 1/065; B60T 8/17; B60T 17/00; B60T 17/221
See application file for complete search history.

(56) References Cited

U.S. PATENT DOCUMENTS

| | | | |
|---|---|---|---|
| 7,021,727 B2 | 4/2006 | Kamiya et al. | |
| 10,351,118 B2* | 7/2019 | Schumann | B60T 13/745 |
| 11,027,713 B2* | 6/2021 | Macpherson | B60T 7/042 |
| 2004/0183366 A1* | 9/2004 | Kamiya | B60T 17/221 |
| | | | 303/11 |
| 2004/0206589 A1* | 10/2004 | Kamiya | F16D 65/0006 |
| | | | 188/106 P |

(Continued)

FOREIGN PATENT DOCUMENTS

DE    10322554 A1    12/2004

OTHER PUBLICATIONS

European Search Report dated May 7, 2019. 5 pages.

*Primary Examiner* — Nicholas J Lane
(74) *Attorney, Agent, or Firm* — RMCK Law Group PLC

(57) ABSTRACT

A vehicle braking system includes a controller that receives signals from sensors associated with vehicle disc brakes, which allow detection of a parameter indicative of a degree of noise generated from each disc brake. When noise generation is detected, the controller activates a noise attenuation function of a first type if the vehicle is braking, and of a second type if the vehicle is not braking. The first type involves reducing actuating pressure of a fluid actuator associated with the disc brake for which noise generation is detected. The second type involves temporarily activating, while the vehicle is running and not braking, the fluid actuator associated with the disc brake which is generating noise. The controller also receives signals indicative of vehicle operating parameters which allow conditions to be defined in which priority is given to vehicle safety, and in which the noise attenuation function is excluded.

10 Claims, 2 Drawing Sheets

(56) References Cited

U.S. PATENT DOCUMENTS

| | | | |
|---|---|---|---|
| 2004/0222696 A1* | 11/2004 | Kamiya | B60T 8/00 |
| | | | 303/191 |
| 2006/0202555 A1* | 9/2006 | Kingston | F16D 65/0012 |
| | | | 303/191 |
| 2007/0216224 A1* | 9/2007 | Schmitt | B60T 8/00 |
| | | | 303/DIG. 1 |
| 2010/0250081 A1* | 9/2010 | Kinser | B60T 8/173 |
| | | | 701/70 |
| 2011/0029211 A1 | 2/2011 | Stephenson et al. | |
| 2016/0290422 A1* | 10/2016 | Cho | B60T 8/176 |

* cited by examiner

METHOD AND SYSTEM FOR REDUCING OR ELIMINATING NOISE GENERATED BY THE DISC BRAKES OF A MOTOR-VEHICLE

CROSS-REFERENCE TO RELATED APPLICATION

This application claims priority to European Patent Application No. 18 200 795.5 filed Oct. 16, 2018. The disclosure of the above application is incorporated herein by reference in its entirety.

FIELD OF THE INVENTION

The present invention relates to motor-vehicle braking systems, of the type comprising a plurality of disc brakes associated with respective motor-vehicle wheels and each including a fluid actuator for actuating the disc brake, and an electronic controller for controlling the activation and the supply pressure of said fluid actuators.

Prior Art

Devices have been already proposed in the past to eliminate or reduce noise, usually in the form of a whistle, which can be generated by a disc brake during its operation, for example, following deterioration of the brake pads, or due to dirt deposited on the brake pads, or due to a vitrification process of the pads or due to a manufacturing or assembly defect.

An example of a device of this type is illustrated in document U.S. Pat. No. 7,021,727 B2. However, all the devices proposed up to now have not been fully satisfactory due to their complexity and/or poor performance.

Object of the Invention

The object of the present invention is to solve the above technical problem with simple and low-cost means.

A further object of the invention is to provide a method and a system capable of reducing or eliminating the noise generated by the disc brakes of a motor-vehicle, both when this occurs during braking of the motor-vehicle, and also when this occurs while the motor-vehicle is running but is not braking, for example, due to a malfunction of the brake pads after a previous braking, and/or due to a defect in how the brake pads are mounted.

Another object of the invention is to provide a method and a system capable of reducing or completely eliminating the noise generated by the disc brakes of a motor-vehicle, without however affecting the safety of the motor-vehicle occupants in any driving condition.

SUMMARY OF THE INVENTION

In view of achieving one or more of the aforesaid objects, the present invention relates to a method for reducing or eliminating the noise generated by the disc brakes associated with the wheels of a motor-vehicle, while the motor-vehicle is moving, said method being characterized in that it comprises the steps of:
 associating at least one sensor with each disc brake, said at least one sensor being configured for detecting a parameter indicative of the degree of noise generated by the disc brake,
 providing an electronic controller configured to receive output signals from the aforesaid at least one sensor associated with each motor-vehicle disc brake, and to activate a noise attenuation function when the value of the aforesaid detected parameter on the basis of the signal emitted by at least one of said sensors exceeds a predetermined threshold value,
 said electronic controller being programmed to activate a noise attenuation function of a first type if the aforesaid exceeding of the threshold value is detected during braking of the motor-vehicle, and a noise attenuation function of a second type if the aforesaid exceeding of the threshold value is detected while the motor-vehicle is moving, when the motor-vehicle is not braking,
 wherein the aforesaid noise attenuation function of the first type consists of reducing an actuating pressure of a fluid actuator associated with the or each disc brake for which exceeding of said threshold value is detected, and
 wherein the aforesaid noise attenuation function of the second type consists of temporarily activating—while the motor-vehicle is running and not braking—the fluid actuator associated with the or each disc brake for which said threshold value is exceeded.

Preferably, the aforesaid electronic controller is configured to receive signals from a plurality of motor-vehicle sensors, which are indicative of one or more operating parameters of the motor-vehicle, selected from steering angle, vehicle speed, speed of each wheel, yaw angle of the vehicle, gear inserted, clutch position, drive mode (for example, normal, sports, etc.), and in that the aforesaid electronic controller is programmed to define a range of values of said operating parameters of the vehicle and/or combinations of said range of values that determine a safety priority condition, said controller also being programmed to exclude the aforesaid noise attenuation function of the first type when a safety priority condition is detected.

Preferably, the aforesaid noise attenuation function of the first type also comprises the operation of increasing the actuating pressure of the fluid actuators associated with the disc brakes for which said threshold value is not exceeded.

The sensors associated with the disc brakes can be, for example, vibration sensors of any known type, for example, accelerometers or piezoelectric sensors.

According to a further preferred characteristic, the aforesaid electronic controller is programmed to count the activation events of the aforesaid noise attenuation function of the first type and/or of the second type and to activate a warning function if the number of counted events exceeds a threshold value. The warning function may consist of displaying a message on a motor-vehicle dashboard display, which invites the user to take the motor-vehicle to be repaired.

The invention also relates to a motor-vehicle braking system configured to perform the above-described method.

DETAILED DESCRIPTION OF THE INVENTION

Further characteristics and advantages of the invention will become apparent from the description that follows with reference to the attached drawings, provided purely by way of non-limiting example, wherein.

Figure 1:
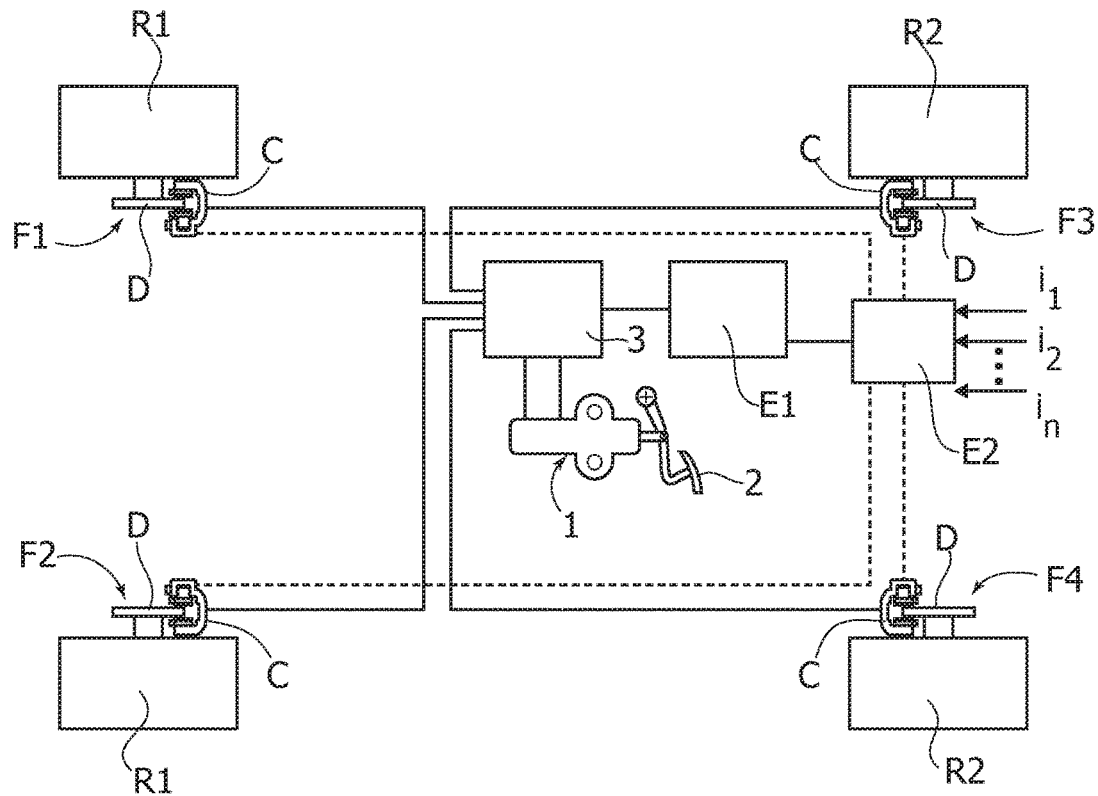
FIG. 1 is a diagram of a braking system according to the present invention.
Figure 2:
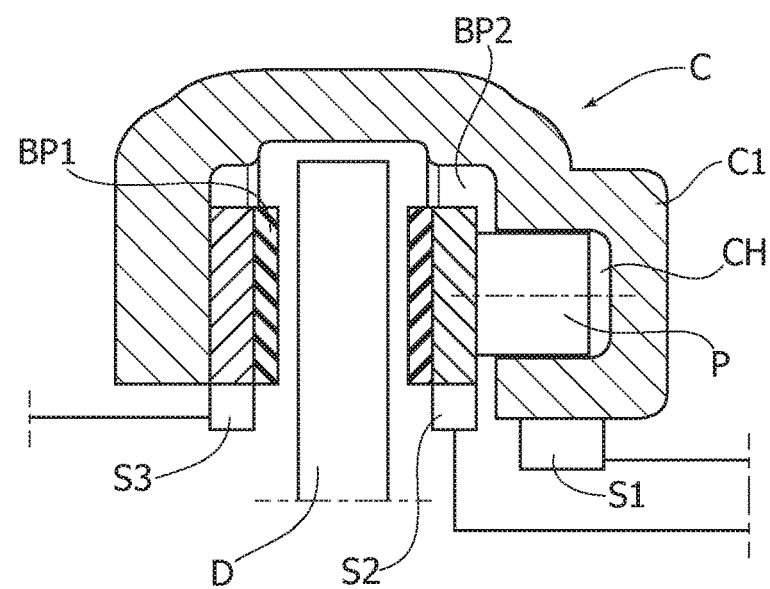
FIG. 2 is a schematic cross-sectional view of a disc brake forming part of the system according to the invention.

In FIG. 1, references R1, R2 indicate the two front wheels and the two rear wheels, respectively, of a motor-vehicle, each of which is associated with a disc brake, indicated by F1, F2, F3, F4, respectively. Each of the disc brakes F1-F4 can be made according to any known technique, and each comprises a disc D rigidly connected to the wheel hub, so as to be able to rotate with the wheel, and a brake caliper C carried by the motor-vehicle structure (not shown) and configured for engaging the disc D to slow down its rotation. FIG. 2 shows, by way of example, a schematic and partial cross-sectional view of a disc brake, including a disc D (of which only the peripheral portion is shown), and a caliper C including a caliper body C1 of a floating type, on which a pad BP1, suitable for engaging a face of the disc D, is rigidly connected. The opposite face of the disc D is designed to be engaged by a second pad BP2 carried by a piston P of the fluid actuator of the brake caliper. The piston P is slidably mounted within a chamber CH defined by the body C1 of the brake caliper. The chamber CH is designed to be supplied with pressurized fluid so as to push the piston P to the left (with reference to the drawing) so as to press the pad BP2 against a face of the disc D. At the same time, the supply of pressurized fluid inside the chamber CH also causes a shift towards the right (with reference to the drawing) of the entire body C1 of the brake caliper, so that the pad BP1 is pressed against the left side (with reference to the drawing) of the brake disc D. Of course, the present description is provided purely by way of example and is limited to the essential components of the brake, the constructional details can be of any known type, according to the general knowledge of those skilled in the art.

Still according to the prior art, the motor-vehicle is provided with a braking device 1 (FIG. 1) operated by a brake pedal 2 and hydraulically connected to a pressure modulator assembly 3 which controls the supply of the pressurized fluid to the fluid actuators of the brake calipers C, each fluid actuator being defined by the chamber CH and the piston P sliding within it.

Still according to the prior art, the braking system comprises an electronic controller E1 connected to the modulator 3 for controlling the operation of the braking system.

According to the invention, one or more sensors S are associated with each of the disc brakes C, so as to allow detection of a parameter indicative of the degree of noise generated by the disc brake. FIG. 2, purely by way of example, shows the use of three sensors S1, S2, S3 associated with the body C1 of the caliper, and with the two supports of the brake pads BP1, BP2, in the form of accelerometers or sensors of any other known type (for example, piezoelectric sensors) configured to detect the vibrations of the body with which they are associated.

As shown in FIG. 1, the sensors S are connected to an electronic controller E2 (which can also be integrated into the main controller E1). The electronic controller E2 is configured to receive the sensor S output signals and to process these signals in order to obtain an index indicating the degree of noise generated by each disc brake F1, F2, F3, F4. For example, the controller E2 can compare the detected vibration frequency with a threshold value, above which the vibration is interpreted as corresponding to the generation of a braking whistle.

Figure 3:
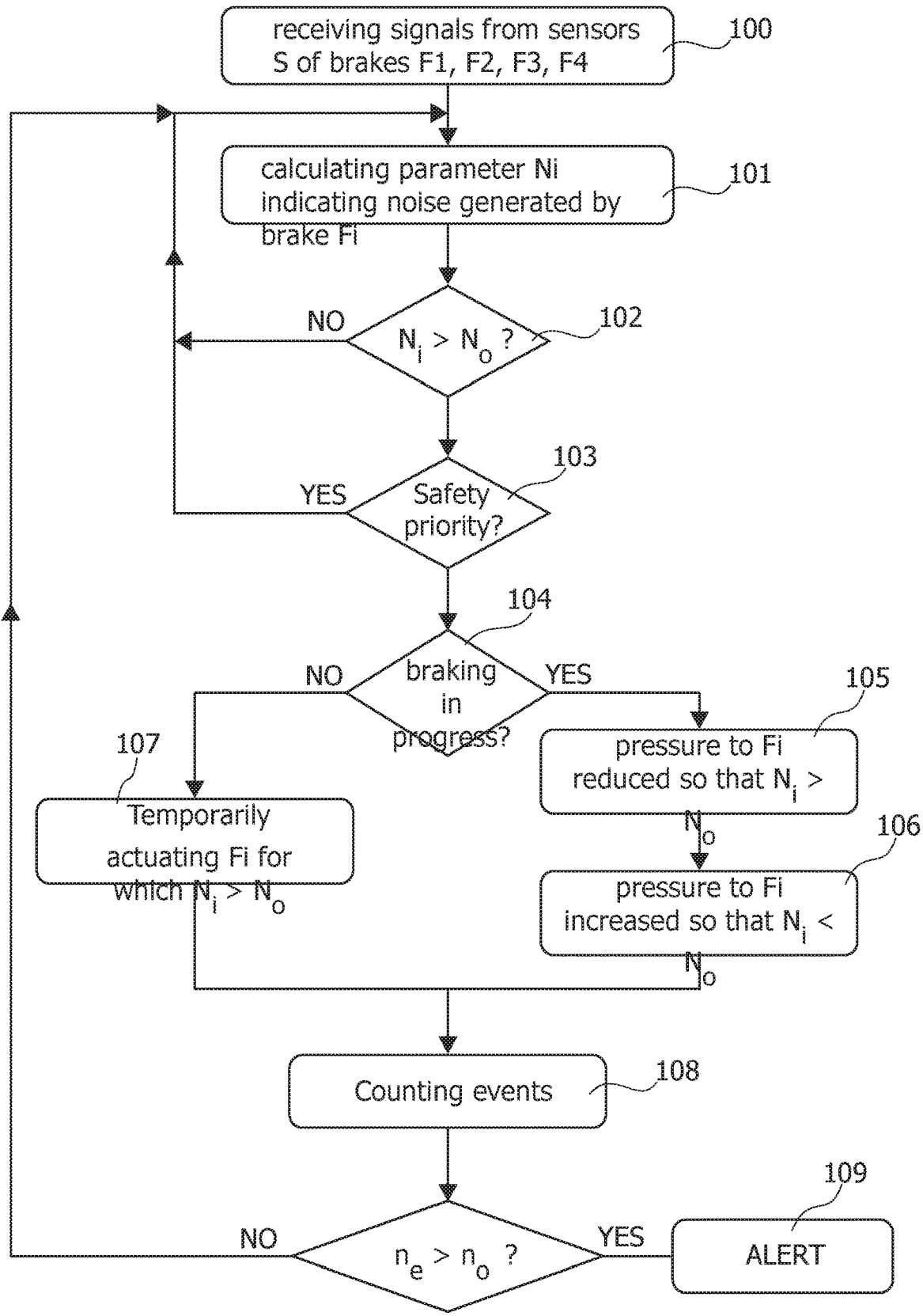
FIG. 3 is a flowchart that illustrates an embodiment example of the method according to the invention.

The flowchart of FIG. 3 shows the step in block 100 in which the electronic controller E2 receives the signals from the sensors S associated with the brakes F1, F2, F3, F4, and the step in block 101 in which the electronic calculator E2 calculates a parameter $N_i$ indicative of the noise generated by each brake $F_i$ on the basis of the signal received by the respective sensor. In block 102, the electronic controller E2 checks whether the parameter $N_i$ is above a predetermined threshold value $N_0$ of this parameter, which is defined as corresponding to the generation of a braking noise (whistle).

In the case in which, for one or more of the brakes F1, F2, F3, F4, the detected parameter $N_1$ is higher than the threshold value $N_0$, the electronic controller E2 checks whether a safety priority exists. This check is carried out thanks to the fact that the electronic controller E2 is configured to receive a plurality of signals $i_1, i_2, \ldots i_n$ from a plurality of sensors of the operating conditions of the motor-vehicle, suitable for detecting one or more parameters chosen between steering angle, vehicle speed, rotation speed of each wheel, yaw angle of the vehicle, gear inserted, clutch position, drive mode (normal, sports, etc.). The electronic controller E2 is also programmed to define a range of values of said operating parameters of the vehicle and/or combinations of said range of values which determine a priority condition of the safety of the motor-vehicle, in which case, any intervention on the brakes of the system according to invention must be excluded.

Returning to FIG. 3, therefore, if on the basis of the signals $i_1, i_2, \ldots i_n$ the electronic controller E2 does not detect the existence of a safety priority, the controller starts the noise attenuation procedure. This procedure differs according to whether the noise has been generated by one or more of the brakes of the motor-vehicle while the motor-vehicle is braking, or while the motor-vehicle is moving, but it is not braking. Even when the motor-vehicle brakes are not operated by the driver, a brake may indeed generate noise, for example, due to incorrect positioning of a brake pad as a result of previous braking, or due to manufacturing defects or incorrect assembly of a brake pad.

The noise attenuation function generated by one or more of the motor-vehicle brakes differs according to whether the noise is generated during braking of the motor-vehicle or when the motor-vehicle is not braking. With reference to FIG. 3, if the block 104 determines that braking is in progress, the electronic controller E2 is programmed to intervene on the braking system of the motor-vehicle in order to reduce the actuation pressure of the brake or brakes, for which the detected parameter $N_i$ is greater than the threshold value $N_0$ (block 105).

Preferably, in this condition, the electronic controller E2 is configured to increase the operating pressure of the other motor-vehicle brakes for which noise generation has not been detected (block 106).

In the case in which one or more brakes of the motor-vehicle generate noise while the motor-vehicle is not braking, the noise attenuation function which is activated by the electronic controller E2 consists of temporarily activating the brake for which noise generation has been detected (block 107). This is carried out by supplying the fluid actuator of the brake which is generating noise with a slight actuating pressure for a short time (in the order of a few seconds), capable of generating a small displacement of the brake pads, presumably sufficient to settle them in a correct position. This procedure can also be repeated in order to impart a succession of small strokes to the brake pads.

As indicated in block 108 of FIG. 3, the system is configured to count the number of activation events of the noise attenuation function, and to detect when the number of events $N_e$ becomes greater than a threshold value $N_0$, in which case a warning function (block 109) is generated, for example, consisting in the visualization of a message on a display on the dashboard of the motor-vehicle, inviting the driver to perform a check of the motor-vehicle brakes by a mechanic.

As is evident from the above description, the system method according to the invention is able to implement an automatic function for reducing or eliminating the braking noise whenever this occurs, by simple and low-cost means, without prejudice to the safety of the motor-vehicle occupants. A further advantage of the system according to the invention is that it can also be easily adapted on motor-vehicles for which it was not originally intended.

Naturally, without prejudice to the principle of the invention, the details of construction and the embodiments may vary widely with respect to those described and illustrated purely by way of example, without departing from the scope of the present invention.

What is claimed is:

1. A method for reducing or eliminating noise generated by disc brakes associated with wheels of a motor-vehicle, while the motor-vehicle is moving, the method comprising:
    associating at least one sensor with each disc brake, said at least one sensor being configured for detecting a parameter indicative of a degree of noise generated by the disc brake,
    providing an electronic controller configured to receive output signals from the at least one sensor associated with each motor-vehicle disc brake, and to activate a noise attenuation function when a value of the parameter detected on a basis of a signal emitted by at least one of said at least one sensor exceeds a predetermined threshold value,
    said electronic controller being configured to activate a first type of the noise attenuation function if the exceeding of the predetermined threshold value is detected during braking of the motor-vehicle, and a second type of the noise attenuation function if the exceeding of the predetermined threshold value is detected while the motor-vehicle is moving and the motor-vehicle is not braking,
    wherein the noise attenuation function of the first type includes reducing, during the braking of the motor-vehicle, an actuating pressure of a fluid actuator associated with the or each disc brake for which exceeding of said predetermined threshold value is detected, and
    wherein the noise attenuation function of the second type consists of includes temporarily activating, while the motor-vehicle is running and not braking, the fluid actuator associated with the or each disc brake for which said predetermined threshold value is exceeded.

2. A The method according to claim 1, wherein said electronic controller is configured to receive signals from a plurality of motor-vehicle sensors, which are indicative of one or more operating parameters of the motor-vehicle, selected among steering angle, vehicle speed, rotation speed of each wheel, yaw angle of the vehicle, gear inserted, clutch position; and drive mode, and said electronic controller is configured to define a range of values of said one or more operating parameters of the motor-vehicle and/or combinations of said range of values that determine a safety priority condition; said controller being also configured to exclude the noise attenuation function when a safety priority condition is detected.

3. A The method according to claim 1, wherein said noise attenuation function of the first type also comprises increasing the actuating pressure of the fluid actuators associated with the disc brakes for which said threshold value is not exceeded.

4. The method according to claim 1, wherein the at least one sensor is a vibration sensors associated with a body of a caliper of each disc brake and/or a brake pad supports.

5. The method according to claim 1, wherein said electronic controller is configured to count activation events of the noise attenuation function and to activate a warning function if a number of counted activation events exceeds an activation threshold value.

6. A motor-vehicle braking system, comprising:
    a plurality of disc brakes associated with respective motor-vehicle wheels, and each including a fluid actuator for actuating the disc brake, and
    an electronic controller to control an activation and a supply pressure of said fluid actuators,
    at least one sensor associated with each disc brake, said at least one sensor being configured for detecting a parameter indicative of a degree of noise generated by the disc brake,
    an electronic controller configured to receive output signals from the at least one sensor associated with each motor-vehicle disc brakes, and to activate a noise attenuation function when a value of the parameter detected on a basis of a signal emitted by at least one of said at least one sensor exceeds a predetermined threshold value,
    said electronic controller being configured to activate a first type of the noise attenuation function if the exceeding of the predetermined threshold value is detected during braking of the motor-vehicle, and a second type of the noise attenuation function if the exceeding of the predetermined threshold value is detected while the motor-vehicle is moving, when the motor-vehicle is not braking,
    wherein the noise attenuation function of the first type includes reducing an actuating pressure of the fluid actuator associated with the or each disc brake for which exceeding of said predetermined threshold value is detected,
    wherein the noise attenuation function of the second type includes temporarily activating, while the motor-vehicle is running and not braking the fluid actuator associated with the or each disc brake for which said predetermined threshold value is exceeded.

7. The system according to claim 6, wherein said electronic controller is configured to receive signals from a plurality of motor-vehicle sensors, which are indicative of one or more operating parameters of the motor-vehicle, selected from steering angle, motor-vehicle speed, rotation speed of each wheel, yaw angle of the vehicle, gear inserted, clutch position, and drive mode; and to define a range of values of said one or more operating parameters of the motor-vehicle and/or combinations of said range of values that determine a safety priority condition; said electronic controller being also configured to exclude the noise attenuation function when a safety priority condition is detected.

8. The system according to claim 6, wherein said noise attenuation function of the first type also comprises increasing an actuating pressure of the fluid actuators associated with the disc brakes for which said predetermined threshold value is not exceeded.

9. The system according to claim 6, wherein the said at least one sensor associated with each disc brakes is a vibration sensors associated with a body of a caliper of each disc brake and/or a brake pad supports.

10. The system according to claim 6, wherein said electronic controller is configured to count activation events of the noise attenuation function and to activate a warning function if a number of counted events exceeds an activation threshold value.

* * * * *